J. F. KIDDER.
VOLUMETRIC METER TESTER.
APPLICATION FILED JAN. 3, 1914.
1,103,882.
Patented July 14, 1914.
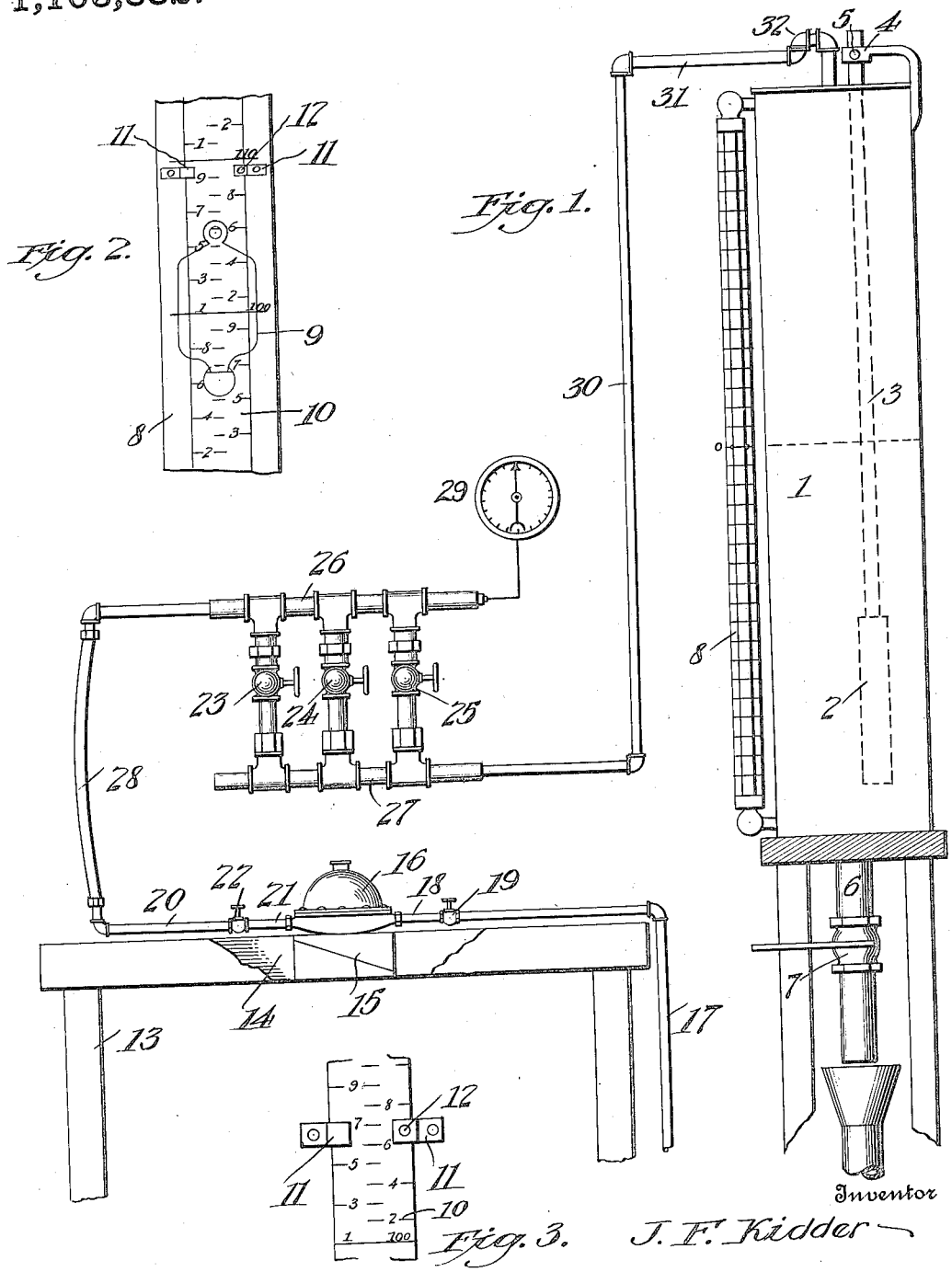

UNITED STATES PATENT OFFICE.

JOHN F. KIDDER, OF BURLINGTON, VERMONT.

VOLUMETRIC METER-TESTER.

1,103,882. Specification of Letters Patent. Patented July 14, 1914.

Application filed January 3, 1914. Serial No. 810,135.

*To all whom it may concern:*

Be it known that I, JOHN F. KIDDER, a citizen of the United States, residing at Burlington, in the county of Chittenden and State of Vermont, have invented certain new and useful Improvements in Volumetric Meter-Testers, of which the following is a specification, reference being had therein to the accompanying drawing.

This invention relates to certain new and useful improvements in volumetric meter testers and is especially adapted to be used for connection with water meters; the object being to provide a tester by means of which, the accuracy or inaccuracy of the meter can be quickly determined.

Another and further object of the invention is to provide a calipered tank having a gage glass for indicating the water level within the tank to the rear of which, is arranged a movable scale which can be adjusted vertically so as to bring the graduations thereof into register with the water level indicated upon the glass, whereby the testing of a meter is greatly facilitated, especially when a number of meters are being tested in succession and the operator in emptying the tank for testing one meter, lowers the water level below the zero point.

Another and further object of the invention is to provide a water meter tester with a number of branches, each having a valve with a different-sized orifice, whereby the meter can be tested under different-sized streams.

Another and further object of the invention is to provide novel means for mounting a meter and connecting the same to a tester in order to allow different-sized meters to be tested in connection with the apparatus.

Another and still further object of the invention is to provide a displacement member in connection with a calipered tank whose exact cubic contents has been actually determined in order that the exact volume of liquid in the tank will be known when testing the water meter.

Other and further objects and advantages of the invention will be hereinafter set forth and the novel features thereof defined by the appended claims.

In the drawing—Figure 1, is an elevation of my improved volumetric testing apparatus showing a water meter in position to be tested; Fig. 2, is an enlarged detail elevation of the water gage and moving scale; and Fig. 3, is a detail of the scale showing the manner of mounting the same in order to allow the same to be adjusted vertically.

Like numerals of reference refer to like parts in the several figures of the drawings.

In carrying out my invention, I employ a calipered tank 1 whose exact cubic content has been actually determined by the use of a displacement member 2 in the form of a hollow body having a rod 3 connected thereto, which extends upwardly through the open top of the tank and is mounted in a guide 4 and locked in its adjusted position by a set screw 5. The tank 1 is provided with an outlet 6 having a lever valve 7 so that the same can be readily emptied by operating the valve. Arranged on the face of the tank, is a water gage glass 8. Mounted within the gage glass, is a float 9 by means of which, the water level within the tank is designated. Arranged to the rear of the water gage glass is a moving scale 10 which is mounted in suitable guides 11 carried by the tank, one of said guides being provided with a thumb screw 12 for locking the scale in its adjusted position.

The advantage of having the scale movably mounted is to allow the same to be set to register with the water level within the tube designated by the float when the operator in emptying the tank has allowed the water level to drop below the point designated by the zero and it will be noted that the designations of the graduated scale are arranged with the numerals one to nine, indicating ten cubic feet or whatever the volumetric contents of the tank may be.

Arranged adjacent the tank, is a table 13 having a drip board 14 on which is mounted an adjustable support 15 upon which, is adapted to be placed, a meter 16 to be tested, which is connected to the water supply pipe 17 by a nipple 18; said pipe being provided with a valve 19. The outlet of the meter is connected to a pipe 20 by a nipple 21; said pipe being provided with a valve 22 and it will be seen by this arrangement, the flow of liquid to and from the meter, can be regulated.

Arranged above the table and supported by any suitable means, is a series of valves 23, 24, 25; each being provided with a different-sized orifice and connected by suitable nipples to parallel pipes 26 and 27, the pipe 26 being connected to the pipe 20 by a flexible hose 28 at one end and is connected at the opposite end to a pressure gage 29. The pipe 27 is provided with an elbow at one end to which is connected, a vertically arranged pipe 30 having a horizontal pipe 31 connected thereto carrying a goose neck 32 extending into the open top of the tank 1 and through which the water passes into the tank.

It will be seen that by operating any one of the valves 23, 24, 25, the water passing through the meter will be discharged into the calipered tank and by setting the scale to register with the water line designated by the float in the water gage tube, after the water has been allowed to pass through the meter and the meter has been read by comparing the reading of the meter with the water level within the tank, the accuracy of the meter can be determined.

I claim:

1. In an apparatus for testing meters, the combination with a meter having means for controlling a supply and discharge of liquid thereto and therefrom, of a measuring tank of determined capacity having a water gage, a scale arranged to the rear of said water gage, a series of valves having different-sized orifices, a connection from said valves to said tank, and a flexible connection from said valves to said meter discharge.

2. In an apparatus for volumetrically testing meters, the combination with a meter, of parallel pipes, valves connecting said pipes provided with different-sized orifices, a flexible connection from one of said pipes to said meter, a tank and a delivery pipe connected to the other pipe for discharging liquid into the tank.

In testimony whereof I affix my signature in presence of two witnesses.

JOHN F. KIDDER.

Witnesses:
HENRY CONLIN,
H. E. GRAY.